(12) United States Patent
Hongo

(10) Patent No.: US 6,224,756 B1
(45) Date of Patent: *May 1, 2001

(54) APPARATUS FOR TREATING ORGANIC RAW WATER UTILIZING ANAEROBIC MICROORGANISMS

(75) Inventor: Kenjiro Hongo, Tokyo (JP)

(73) Assignee: Hongo Company Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/326,388

(22) Filed: Jun. 4, 1999

(30) Foreign Application Priority Data

Jun. 5, 1998 (JP) .................................................. 10-172061

(51) Int. Cl.$^7$ ....................................................... C02F 3/28
(52) U.S. Cl. ........................... 210/150; 210/194; 210/196; 210/197; 210/615
(58) Field of Search ..................................... 210/150, 151, 210/194, 195.1, 197, 615, 603, 196

(56) References Cited

U.S. PATENT DOCUMENTS

| | | | |
|---|---|---|---|
| 3,112,261 | * 11/1963 | Porter et al. | 210/150 |
| 3,329,271 | * 7/1967 | Ward et al. | 210/150 |
| 3,371,033 | * 2/1968 | Simmons et al. | 210/150 |
| 4,427,548 | * 1/1984 | Quick, Jr. | 210/150 |
| 4,477,394 | * 10/1984 | Armstrong | 210/150 |
| 4,599,167 | * 7/1986 | Benjes et al. | 210/150 |
| 4,954,257 | * 9/1990 | Vogelpohl et al. | 210/197 |
| 5,096,579 | * 3/1992 | Jordan et al. | 210/194 |
| 5,190,641 | * 3/1993 | Hattori et al. | 210/151 |
| 5,228,995 | * 7/1993 | Stover | 210/150 |
| 5,972,212 | * 10/1999 | Hongo | 210/150 |

FOREIGN PATENT DOCUMENTS 3-207493 * 9/1991 (JP) .

* cited by examiner

*Primary Examiner*—Christopher Upton
(74) *Attorney, Agent, or Firm*—Lackenbach Siegel Marzullo Aronson & Greenspan

(57) ABSTRACT

A raw water purifying apparatus utilizing anaerobic microorganisms comprising a casing (1) and a carrier assembly (2). The casing (1) is a vertical type and comprises a body (3), a bottom wall (4) and a ceiling (5). At the upper portion of the casing an inflow port (6) of raw water is open and at the lower portion an outflow port (7) is located. The carrier assembly (2) is formed by piling plural carrier discs (8) of porous plastic material, such as polyethylene for rooting anaerobic microorganisms inclusively therein with each space (9) between every two carrier discs (8), so as not to overlap liquid passages (10) which are provided evenly all over each disc (8) through thereof with each other. The carrier assembly (2) is disposed in said casing (1) so s to prevent the direct leading of said inflow port (6) to said outflow port (7), and the raw water may be treated once or repeatedly.

20 Claims, 13 Drawing Sheets

APPARATUS FOR TREATING ORGANIC RAW WATER UTILIZING ANAEROBIC MICROORGANISMS

BACKGROUND OF THE INVENTION

1. Field of the Invention

This invention relates to an apparatus for treating organic raw water utilizing anaerobic microorganisms and more particularly to an apparatus for treating raw water contained organic matter, or the like such as, living drainage, factory drainage, etc., by utilizing anaerobic microorganisms.

2. Prior Art

Japanese patent application No. 9-199208 (see counterpart U.S. Pat. No. 5,972,212) by the applicant relates to an apparatus of the type in which raw water is treated in circulation by aeration, and by aerobic microorganisms.

Also, known is an apparatus that eliminates, in the same treating times as usual with an activated silt method, biochemically nitrogen, phosphorus, etc. of raw water, by making higher the density of germs, by inserting in a bioreaction tank spherical or foamed cubic carriers for rooting microorganisms thereto.

The apparatus shown in Japanese patent application No. 9-199208 uses air and it cannot apply to a case where anaerobic microorganisms are used.

Spherical or foamed carriers become considerable in numbers, and it is very troublesome to treat same by washing or replacing.

SUMMARY OF THE INVENTION

It is an object of the present invention to offer an apparatus for treating organic raw water utilizing anaerobic microorganisms to resolve these problems.

An apparatus for treating organic raw water utilizing anaerobic microorganism of the present invention comprises a casing and a carrier assembly.

The casing is a vertical type and has a main body, a bottom wall and a ceiling. The casing is open and an inflow port for raw water is provided at the upper portion thereof and an outflow port for the treated water is provided at the lower portion thereof.

The carrier assembly is assembled, by piling plural carrier discs of porous polyethylene for rooting anaerobic microorganisms inclusively therein, with each space between every two carrier discs. Liquid passages provided evenly all over each disc through thereof do not overlap vertically with each other. The carrier assembly is disposed in the casing so that the carrier assembly prevents direct leading of the water to be treated from the inflow port to the outflow port.

The casing is preferably cylindrical, but it may be angulate. The inflow of raw water may be naturally by head or under pressure by pump. The outflow ports are open at the lower portion than the lower end plane of the carrier assembly. If desired the bottom plate and the ceiling wall can be arranged so as to be removed from the casing, so that the carrier assembly is easily inserted in and removed from the casing.

The material of the carrier disc is the same as adopted in the apparatus of Japanese patent application No. 9-199208 and is high density polyethylene now on sale under the article name [POLEX] (the trade mark of TECHNOLOGIES CO., LTD. of Japan)

The number of the carrier discs is determined according to properties of the raw water.

Preferably, said casing has an outflow port for the treated water above said inflow port, said outflow port connects with a circuit and said circuit connects by means of a pump with a circulating water supply port which is open within said casing between levels of said inflow port and said outflow port.

This construction has no fear of raw water being taken out without being treated and also the treated water which is fed in the casing flows out as it is through the outflow port. Accordingly, the water being treated turns in some numbers and is purified, after which it is taken out through the outflow port.

Also, as the outflow passage is not disposed under the lower portion of the casing, it does not need the space and it is not necessary to open an outflow port through the casing. The outflow port may be an opening itself at the lower end of the outflow passage.

Preferably, said outflow port passes in said casing through orifices which are perforated radially above said outflow port through a circular wall coaxially installed in said casing.

Raw water does not flow directly to the orifice, and from the outflow port only purified water is taken out.

Preferably, a part of said circuit is an outflow passage formed on the axial line of said carrier assembly, and an opening at the lower end of said outflow passage is said outflow port.

Preferably, said outflow passage is the continuation of axial holes of central spacers each of which is fitted, to form a space between two carrier discs, in a hole perforated on the axial line of said carrier disc.

By connecting a plurality of said central spacers with each other, and by fitting them in said axial hole of said carrier disc, the axial holes of these central spacers form in a series a passage and an outflow passage that can be formed without another pipe.

Preferably, said outflow port passes in an alternative way by a changeover valve to a drain and a circuit.

When raw water is desired to be treated at one time, the outflow port is connected to the drain. In this case, the treated water may flow down naturally or may be positively drained by arranging a pump between the outflow port and the drain.

When it is necessary to treat raw water repeatedly, the outflow port is connected to the circuit and positively flowed in the by use of a pump. Accordingly, it can easily be fitted with the property of raw water.

Preferably, said carrier assembly comprises support frames, said carrier discs and outer spacers, said support frames and said carrier discs being provided with holes for bolts on the same vertical lines, and with said carrier assembly being assembled, by piling carrier discs on said support frames by means of outer spacers, by passing said bolts through said holes and axial holes of said outer spacers, and by fastening nuts onto said bolts, and with said carrier assembly being settled by fixing said support frames to the arms of said casing.

When the carrier discs and the spacers increase in number, they are made into one body by fastening with bolts and nuts on the support frames.

Preferably, said support frame comprises a boss, arms, frames and a central support ring, said. The boss has a hole fitting with said axial hole of said central spacer, said arms protruding radially from said boss, said frames being spanned between the end portions of said arms and perforated with said holes, said central support ring having an inner diameter larger than said hole, fitting with outer diameter of said central spacer and being set to said arms at one end of said boss concentrically therewith.

The arms and frames are used for supporting the carrier discs.

Preferably, said frames have at one ends of said holes outer support rings for closely receiving said outer spacers.

The outer spacers are supported stably in the outer support rings.

Preferably, said carrier disc is formed, connecting outer units circularly around an outer circumference of a regular hexagonal object with H-shaped rails and corner spacers, each of said outer units being the shape enclosed with lines which are a line of said regular hexagonal object, radiative lines from the center of each end of said line of said regular hexagonal body and a circular arc of said casing cut off by said radiative lines.

In case an area of the carrier disc is large, as it can be formed, by connecting the regular hexagonal body and the outer unit by means of H-shaped rails and the corner spacers, it becomes a matter easily to deal with. The corner spacers are used for connecting the H-shaped rails with each other and regulate spaces between each two carrier discs.

Preferably, regular hexagonal body is formed, by connecting plural regular hexagonal units in a honeycomb fashion with each other and also in the empty portions in the outer circumference rhombic segments with the neighboring regular hexagonal units by means of said H-shaped rails, corner spacers and intermediate spacers.

It is suitable for a casing of large sectional area. The intermediate spacer is used, located at each top of the regular hexagonal unit and the rhombic segment, for connecting the H-shaped rails with each other and it regulates the space between each two carrier discs.

Preferably, said corner spacer comprises space forming portions, a protrusion beneath said corner spacer, a protrusion receiver which protrudes coaxially from the upside of said protrusion and a pair of rail receivers which protrude at an angle of 120 degrees at right angle with the axial line of said protrusion, from said protrusion a hole for said bolt passing through said protrusion receiver and said H-shaped rails being connected supported by said pair of rail receivers with each other.

The corner spacers are securely connected with each other by means of the protrusion and the protrusion receiver, and also they fit the objects for connecting the H-shaped rail with each other and for forming a space between the carrier discs.

Preferably, said central spacer comprises, with respect to a large diameter portion at one end of said axial hole, an inner step for regulating a fitting extent of another similar central spacer and an outer step for regulating a fitting extent of said carrier disc, the dimension from said outer step to the end face of said large diameter portion regulating said space, the dimension between said end face of said central spacer and said outer step of said another said central spacer being so settled as to suit with the thickness of said carrier disc when said another central spacer comes in contact with said inner step.

Merely making the central spacers fit in with each other by making each central spacer fit in each axial hole of each carrier disc, the carrier discs are connected with the settled space, securely.

Preferably, said outer spacer comprises by stages from one end to the other on its axial line a base, an axial portion and a fit-in portion, the axial length of said base regulating said space, the axial length of said axial portion fitting with the thickness of said carrier disc, the axial length of said fit-in portion fitting with the axial length of an enlarged portion which is formed, to set said fit-in portion of an outer spacer of a similar construction to said outer spacer, in an end portion on said base side of said axial hole.

As the mutual outer spacers are regulated on their fit-in depth by means of the axial portion and the enlarged portion, the carrier disc is prevented from deforming by overfastening with a bolt and nut.

Preferably, said intermediate spacer comprises a space forming portion, a protrusion beneath said space forming portion, a protrusion receiver which protrudes coaxially from the upside of said protrusion, a pair of rail receivers which protrude at an angle of 180 degrees at right angle with the axial line of said protrusion and a rail receiver which protrudes between said rail receivers at 60 degrees with one or the other side thereof, a hole for said bolt passing from said protrusion through said protrusion receiver, and said H-shaped rails being connected with each other, supported by said pair of rail receivers.

The H-shaped rails can be connected with each other, therefore, the H-shaped rails of long sizes are not necessary.

Preferably, each of a said liquid passages is the shape of cone cut off at its head, the inner diameter of said liquid passage at the inflow side being larger than that of said at the outflow side.

When the raw water or the treated water passes through said liquid passages, their current speeds at the outflow sides rise and they come into collision with and diffuse on the carrier discs. Thus, they get many opportunities for contacting with microorganisms and their purifying efficiency are therefore raised.

BRIEF DESCRIPTION OF THE DRAWINGS

FIG. 6 is an plan view of the frame.

DETAILED DESCRIPTION OF THE INVENTION

In the following explanation, throughout whole drawings, the same characters show the same or the corresponding portions.

Figure 1:
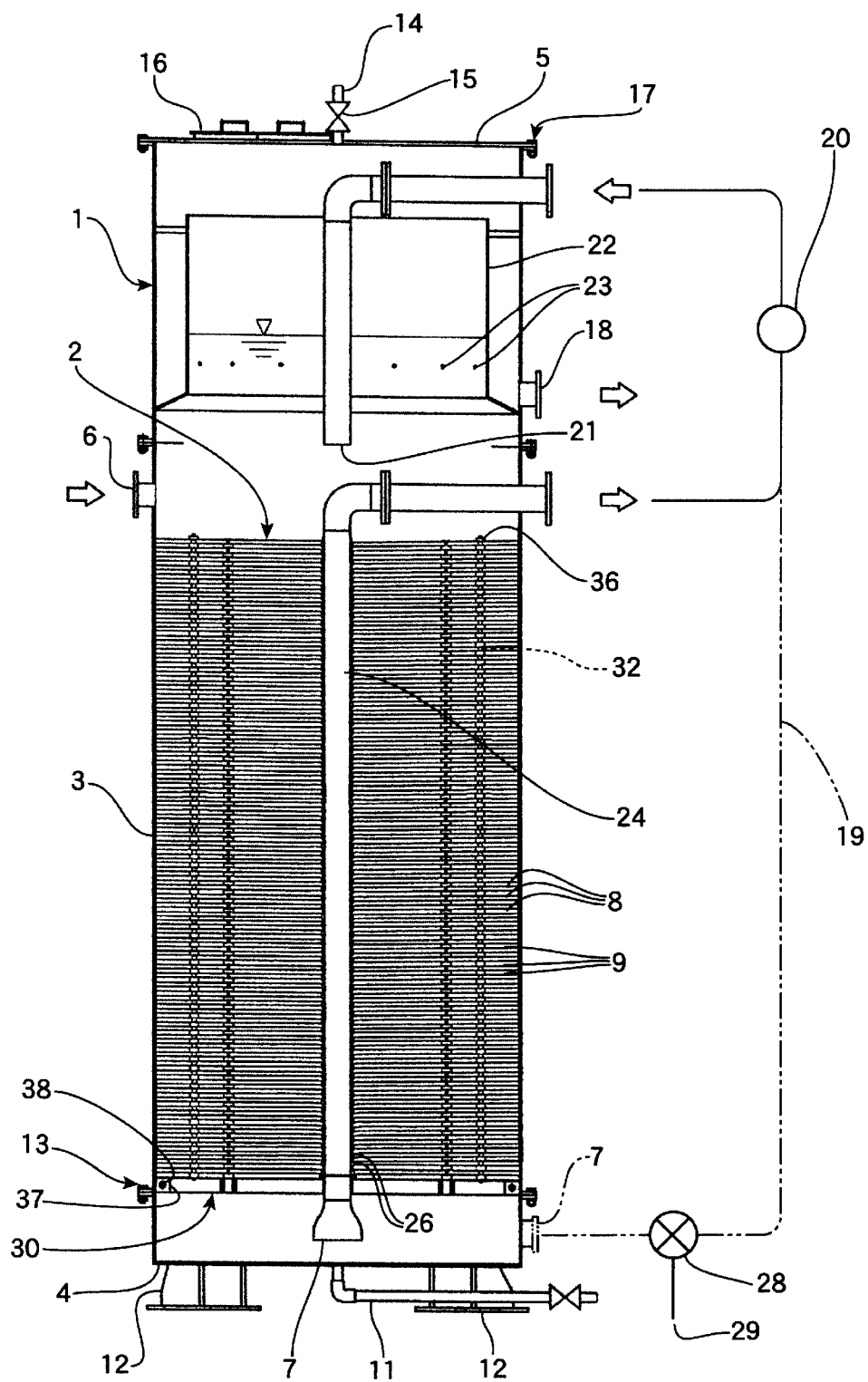
FIG. 1 is a partially cut off side view, which illustrates one embodiment, of the apparatus for treating raw water utilizing anaerobic microorganisms of the present invention.
Figure 2:
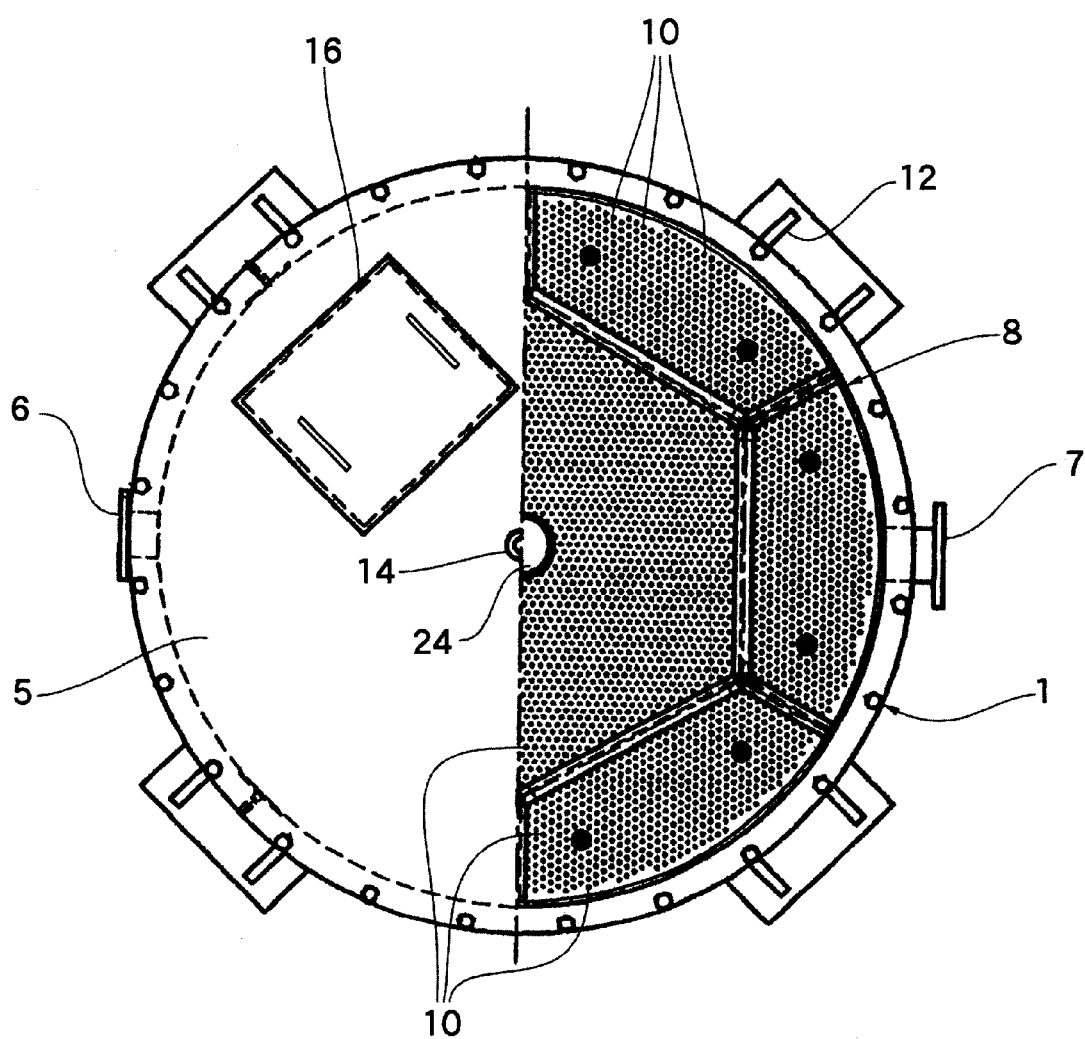
FIG. 2 is a plan view thereof.

In FIG. 1, reference number 1 denotes a casing and a carrier assembly 2 is shown. The casing 1 is vertical and comprises a body 3, a top or bottom plate 4 and a ceiling 5. At the upper portion of the body 3 an inflow port 6 for raw water is open and at the lower portion an outflow port 7 for the treated water is open.

The carrier assembly 2 is assembled, by piling plural carrier discs 8 of porous polyethylene for rooting anaerobic microorganisms inclusively therein with each space 9 between every two carrier discs 8, so as not to overlap liquid passages 10 which are provided evenly all over each disc 8 through them with each other.

The carrier assembly 2 is settled in the casing 1 and prevents the direct leading of the inflow port 6 to the outflow port 7.

The carrier disc 8 is porous and for rooting anaerobic microorganisms inclusively there as noted hereinabove.

A drain pipe 11 is provided to the bottom plate 4. Legs 12 support the casing and bolts and nuts 13 detachably attach the bottom plate 4 onto the body 3. An exhaust 14 with a valve 15 is provided to the ceiling 5. An inspection hole 16 has a cap and bolt-nuts 17 attach the ceiling 5 onto and detach it form the body 3.

Anaerobic microorganisms are rooted comprehensively in the carrier disc 8, and the time for comprehensively rooting may be before or after the carrier disc 8 being assembled to the carrier assembly 2.

Raw water to be treated is feed in the casing 1 through the inflow port 6. The raw water may be fed naturally by its head or positively by pump. The raw water comes into collision with the uppermost carrier disc 8 of the carrier assembly 2 in the casing 1 and diffuses thereon, and then the raw water flows down through the flowing passages 10 in the under space 9.

During its passage in the apparatus, the raw water contacts with the carrier disc 8, organic matter, nitrous acid nitrogen and nitric acid nitrogen which are dissolved in the raw water become the prey of the anaerobic microorganisms comprehensively rooted in the carrier disc 8. The raw water flowing down in the space 9 diffuses on the surface of another carrier disc 8 just under the carrier disc 8.

The flowing passages 10 of the carrier disc 8 are arranged unsymmetrically in right and left sides on a bisector of the carrier disc 8 so that when the phases of the upper and lower carrier discs 8 are shifted, the flowing passages 10 of each carrier disc 8 locate such positions so as not overlap with each other on a projected plane. Therefore, the raw water does not directly flow in the flowing passages 10 of the under carrier disc 8 and it is thus a turbulent flow thereon. Also, during the pass through the carrier disc 8, organic matter, nitrous acid nitrogen and nitric acid nitrogen again become the prey of the anaerobic microorganisms comprehensively rooted in the carrier disc 8.

Hereinafter similar functions are repeated and the raw water is gradually purified. After passing through the lowest carrier disc 8, the raw water is thus purified and flows out through the outflow port 7.

When it can not enough purify by such a temporary treatment, it is good to treat repeatedly the treated water flowing out through the outflow port 7 by feeding it with a pump into the upper portion of the casing 1. In this case, it may temporary be stop to supply and take out raw water, drain the treated water when finished and again supply raw water.

The carrier disc 8 has continuous porous inner pores. The diameter of the pore is from 65 $\mu$m–120 $\mu$m (average 80 $\mu$m).

Therefore, it can regulate the entering of other organisms which have no direct relation to treatment such as some germs, protozoans, etc. into the inner pores. It can easily present the optimum habitat limited within useful germs for treatment and increase by leaps and bounds the keeping volume of the useful germs. Accordingly, it can shorten the time per treatment a set quantity of organic raw water.

As anaerobic microorganisms live in the inner pores of the carrier disc 8, they do not come off and flow out of an apparatus by the action of water. Accordingly, it becomes unnecessary for the retrieving of any "lost" microorganisms and an mechanism to feed back them to an apparatus is necessary. Also, as a habitat is good and the necessary numbers of germs for treating are rooted, if food is assured, it can maintain a stable effect without the need for any special charting of organisms in a continually operated apparatus of the invention.

With respect to quality of raw water, it is dealt with, suitably by adjusting the number of the carrier discs 8 or arranging the treating apparatuses in series. With respect to the quantity of raw water, it is dealt with, planning the capacity of the casing 1 so as to fit thereto or arranging the treating apparatuses in parallel. A circulating quantity of water being circulated is so settled as to be the highest contacting efficiency of circulating water with the piled carrier discs and so as not to raise on excessive pressure loss.

Further, in combination with an aerobic treating apparatus, so that it may be used as a high-grade treating apparatus which has a denitrogen function for nitrous acid nitrogen and nitric acid nitrogen.

The casing 1 has a taking out port 18 for the treated water above the inflow port 6 and the outflow port 7 connects with a circuit 19. The circuit 19 connects by means of a pump 20 with a circulating water supply port 21 which is open within the casing 1 between levels of the inflow port 6 and the taking out port 18.

In this case, the raw water does not flow out as it is without treatment. Also, the circulating water which is fed in the casing 1 does not flow out as it is through the outflow port 18. Accordingly, the water to be treated is taken out continuously through the outflow port 18 after it has been purified by repeated turns of certain numbers.

The overflow port 18 passes in the casing 1 through orifices 23 which are perforated radially above the overflow port 18 through a circular wall 22 coaxially installed in the casing 1.

In this case, the purified water which exists in the upper portion of the casing 1 is taken from the overflow port 18 through the orifices 23 of the circular wall and it can prevent the flowing out of insufficiently treated water.

A part of the circuit 19 is an outflow passage 24 formed on the axial line of the carrier assembly 2, and an opening at the lower end of the outflow passage 24 is the outflow port 7.

In this case, beneath the casing 1 the circuit 19 is not exposed and it does not become an obstruction.

The outflow passage 24 is the continuation of an axial hole 27 of a central spacer 26 (shown in FIGS. 1, 3, 4 and 5) which is fitted, to form space 9 between two carrier discs 8, in a hole 25 perforated on the axial line of the carrier disc 8.

In this case, by connecting plural central spacers 26 with each other, fitting them in each axial hole 25 of each carrier disc 8, the axial holes 27 of these central spacers 26 form in series an outflow passage 24 and it is not necessary to use separately a pipe.

The outflow port 7, as shown in FIG. 1 with an imaginary line, passes in an alternative way by a changeover valve 28 to a drain 29 and the circuit 19.

In this case, when raw water may be treated at one time, the outflow port 7 is connected to the drain 29. The treated water may flow down naturally or be positively drained by a pump between the outflow port 7 and the drain 29.

When it is necessary to treat raw water repeatedly, the outflow port 7 is connected to the circuit 19 and positively pump the raw water by a pump 20. Accordingly, it can easily be fitted with the property of raw water.

Figure 6:
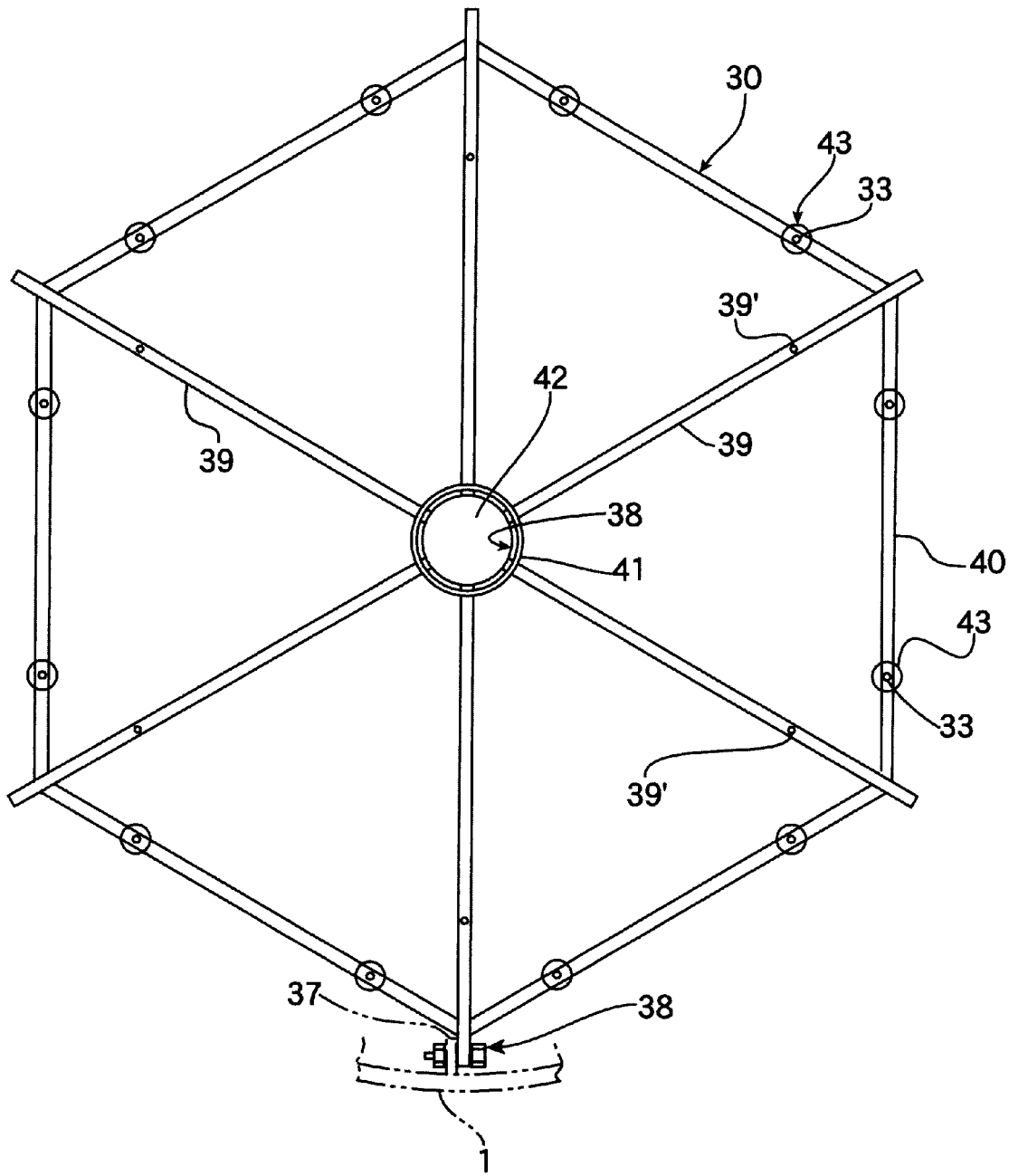
FIG. 6 is a plan view, with a cut off of the lower half of the central spacer.
Figure 7:
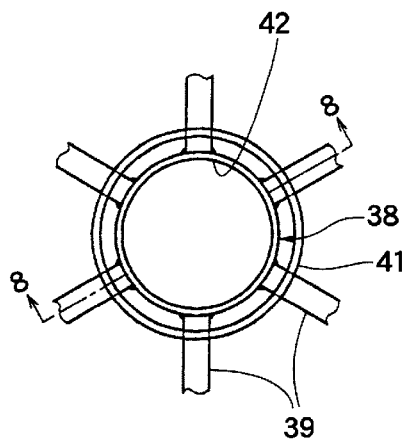
FIG. 7 is a plan view of the boss.
Figure 8:
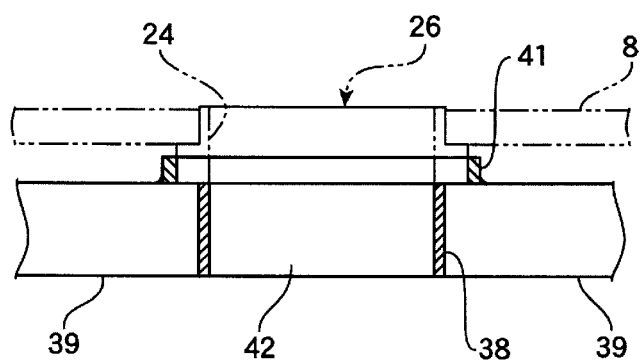
FIG. 8 is a section along line 8—8 of FIG. 7.
Figure 9:
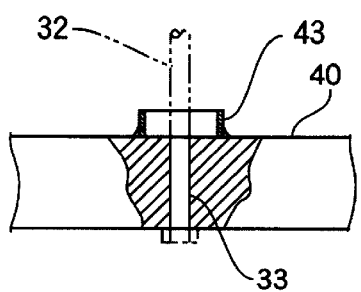
FIG. 9 is a section of the outer ring portion of the outer spacer.
Figure 10:
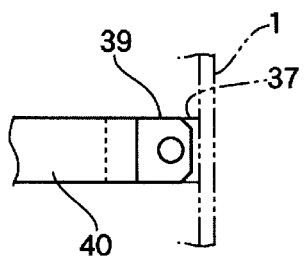
FIG. 10 is detail of a supporting mechanism of the frame to the casing.
Figure 11:
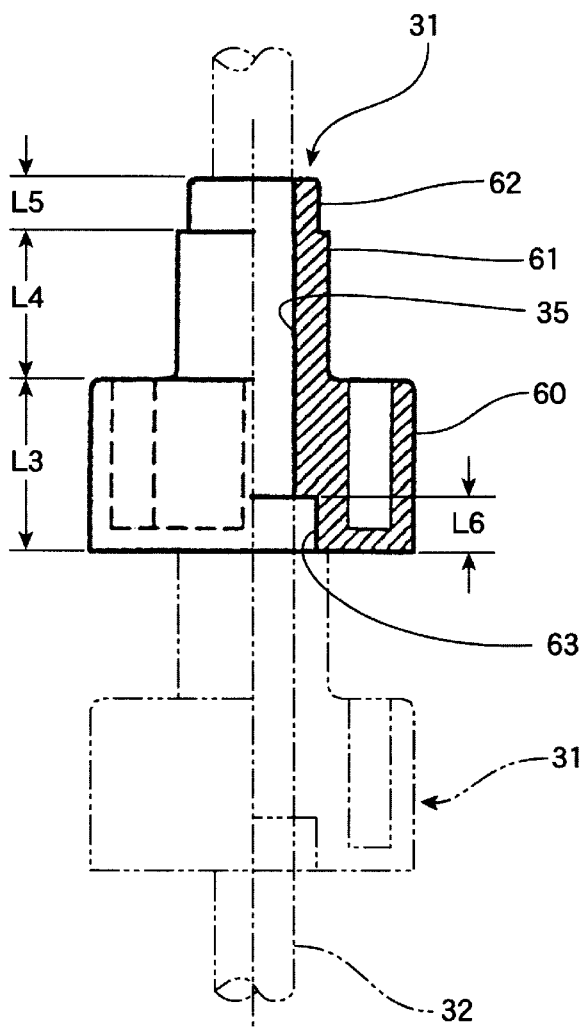
FIG. 11 is a half-sectioned side elevation of the outer spacer.
Figure 12:
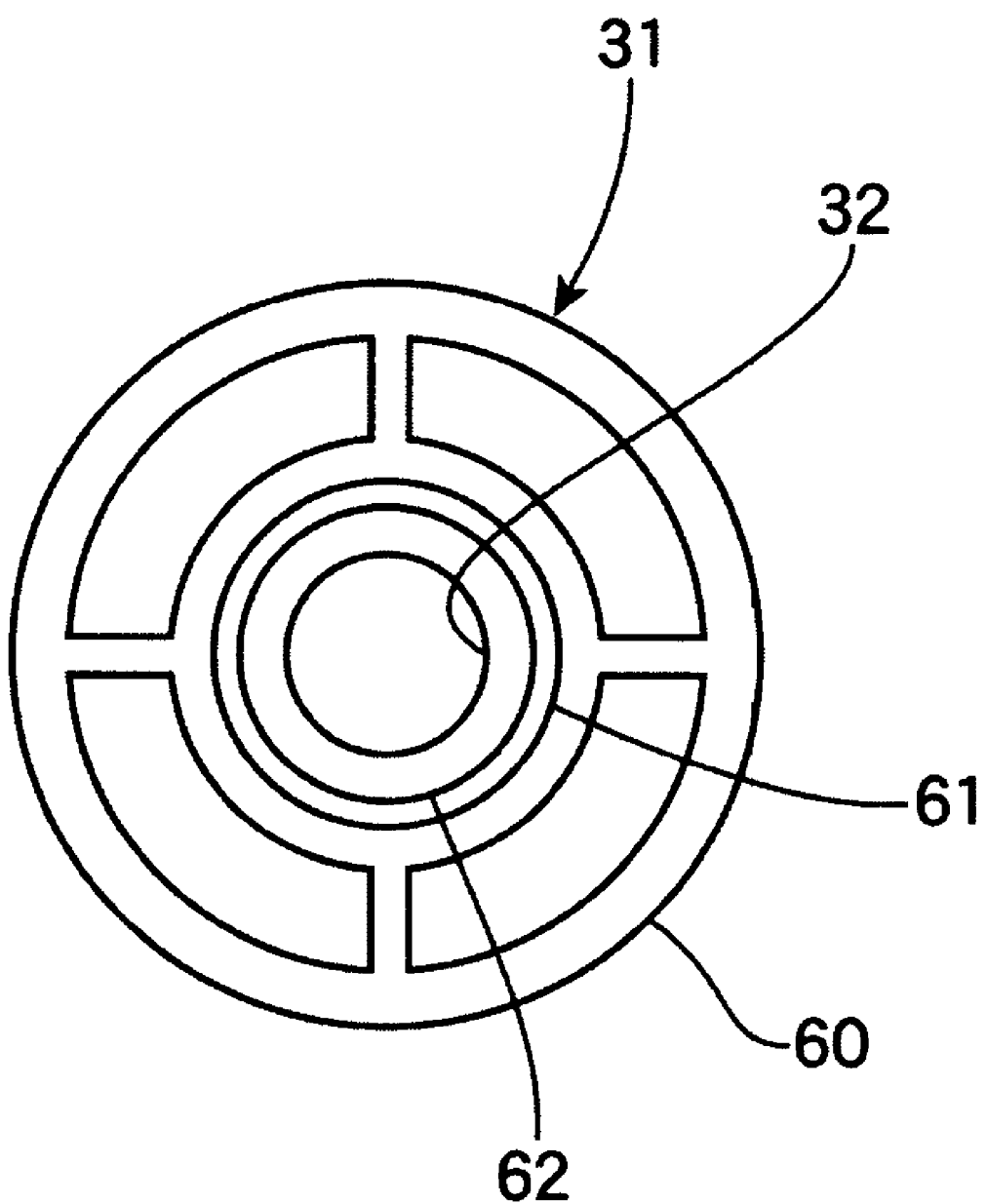
FIG. 12 is a plan view of the same.
Figure 13:
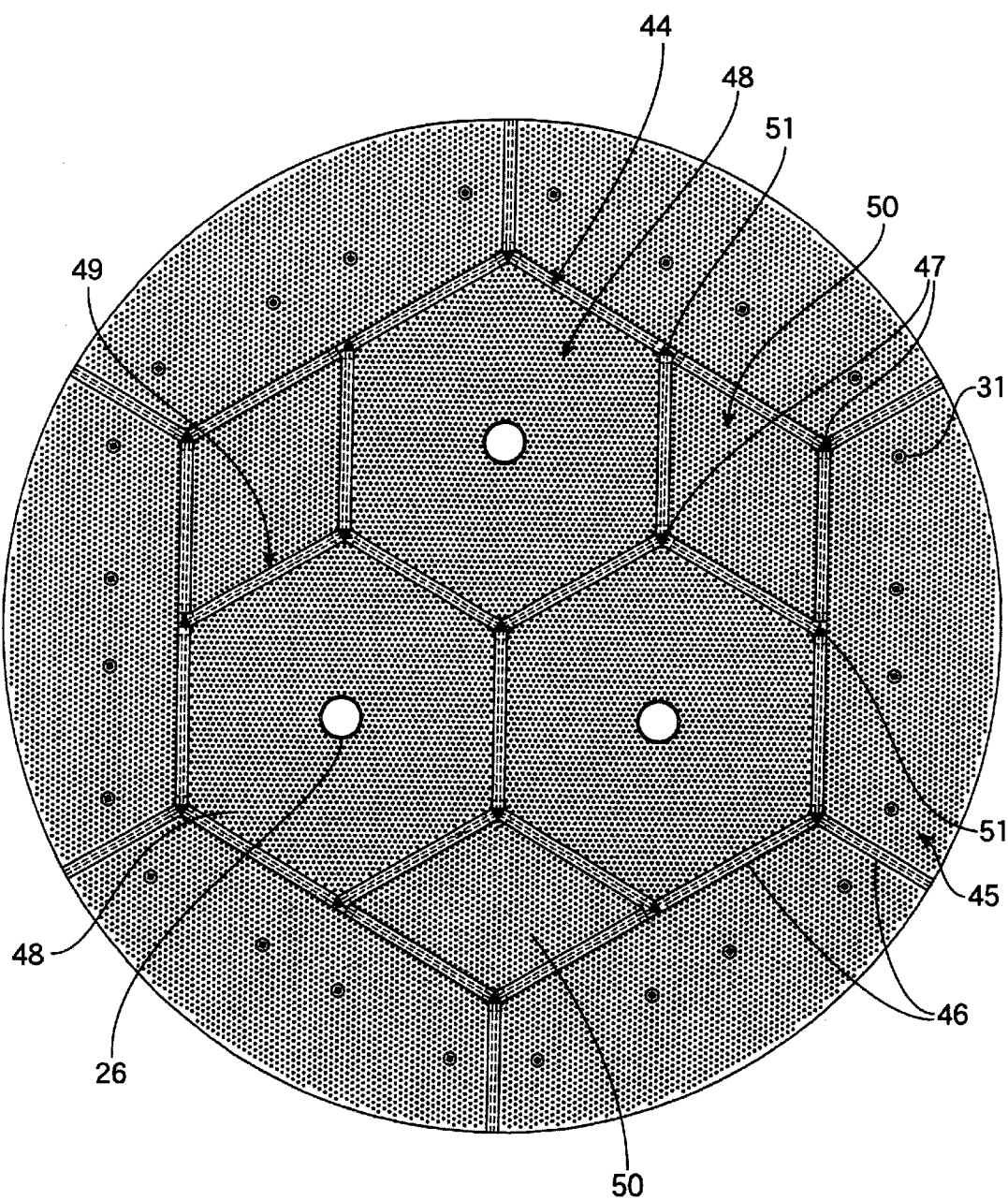
FIG. 13 is a plan view illustrating another embodiment of a carrier disc.
Figure 14:
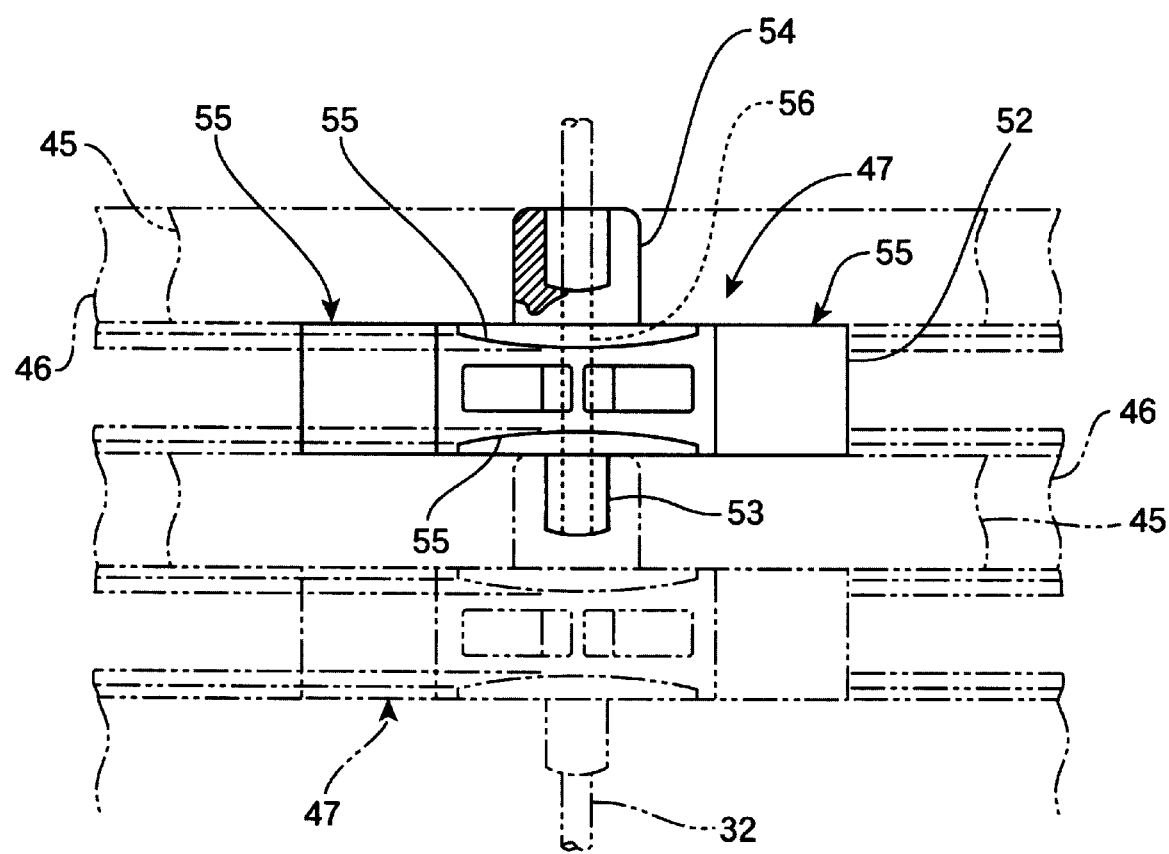
FIG. 14 is a partially cut off side view of the corner spacer.
Figure 15:
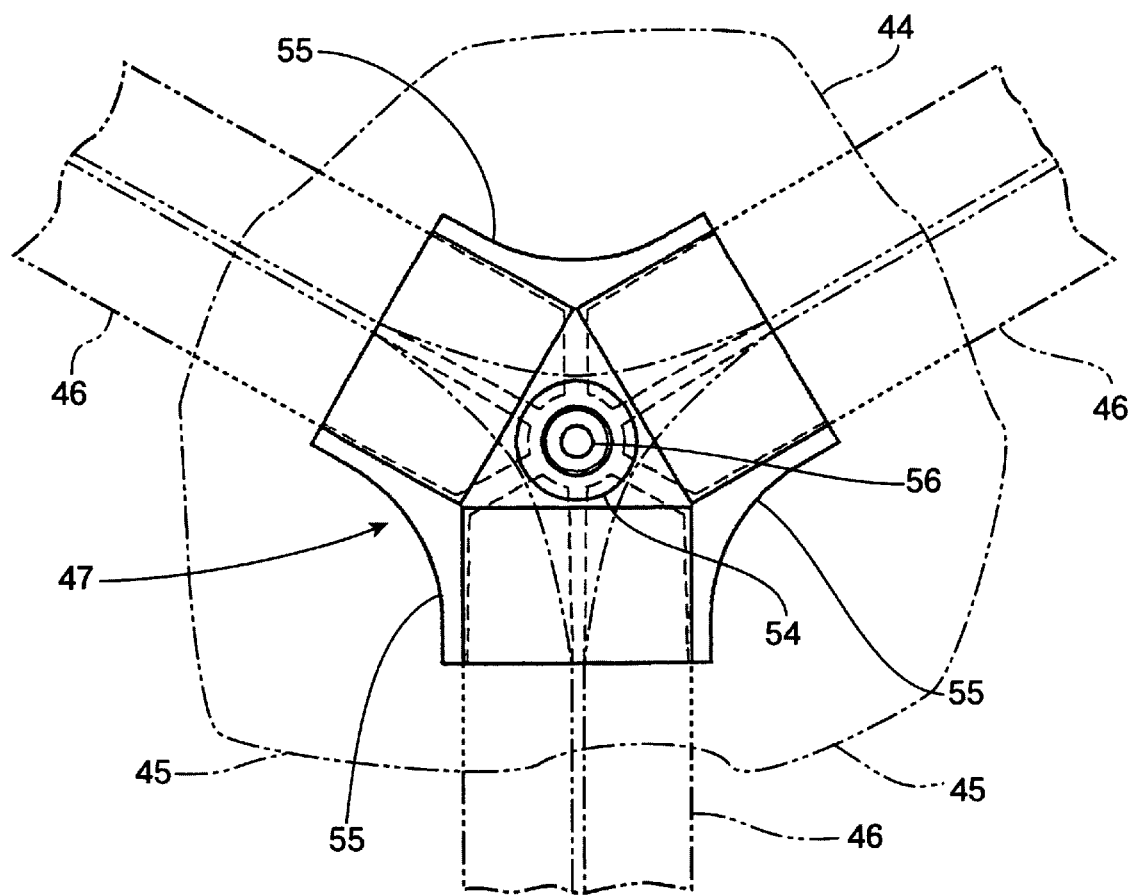
FIG. 15 is a plan view of the same.

The carrier assembly 2 comprises support frames 30 (FIG. 6), the carrier discs 8 and outer spacers 31 (FIGS. 11 and 12). The support frames 30 and the carrier discs 8 are provided with holes 33 and 34 for bolts 32 on the same vertical line. The carrier assembly 2 is assembled, by piling carrier discs 8 on the support frames 30 by means of the outer spacers 31, by passing the bolts 32 through the holes 33 and 34 and axial holes 35 of the outer spacers 31, by fastening nuts 36 onto the bolts 32. The carrier assembly is settled by fixing the support frames 30 to arms 37 of the casing 1.

In this case, when the carrier discs 8 and the outer spacers 31 increase in number, they are made in one body by fastening with bolts 32 and nuts 36 on the support frames 30 and easily treated.

The support frame 30 comprise a boss 38, arms 39, frames 40 and a central support ring 41. The boss 28 has a hole 42 fitting with the axial hole 27 of the central spacer 26. The arms 39 protrude radially from the boss 38. The frames 40 are spanned between the end portions of the arms 39 and are perforated with the holes 33. The central support ring 41 is of an inner diameter larger than the hole 42 which fits with outer diameter of the central spacer 26 and is set to the arms 39 at one ends of the boss 38 concentrically with the boss.

In this case, the lowest central spacer 26 is fitted in the central support ring 41 and is supported by the underside thereof with the boss 38 and the arms 39. Therefore, the central spacer 26 does not move horizontally or fall off and the outflow passage 24 is thus formed.

The frames 40 have at one end of the hole 33 outer support ring 43 for closely receiving the outer spacer 31.

In this case, as the outer spacer 31 fits in the outer support ring 43 and is supported at its bottom on the frames 49, the outer spacer 26 does not move horizontally or fall off, and the carrier assembly 2 is not deformed.

Figure 3:
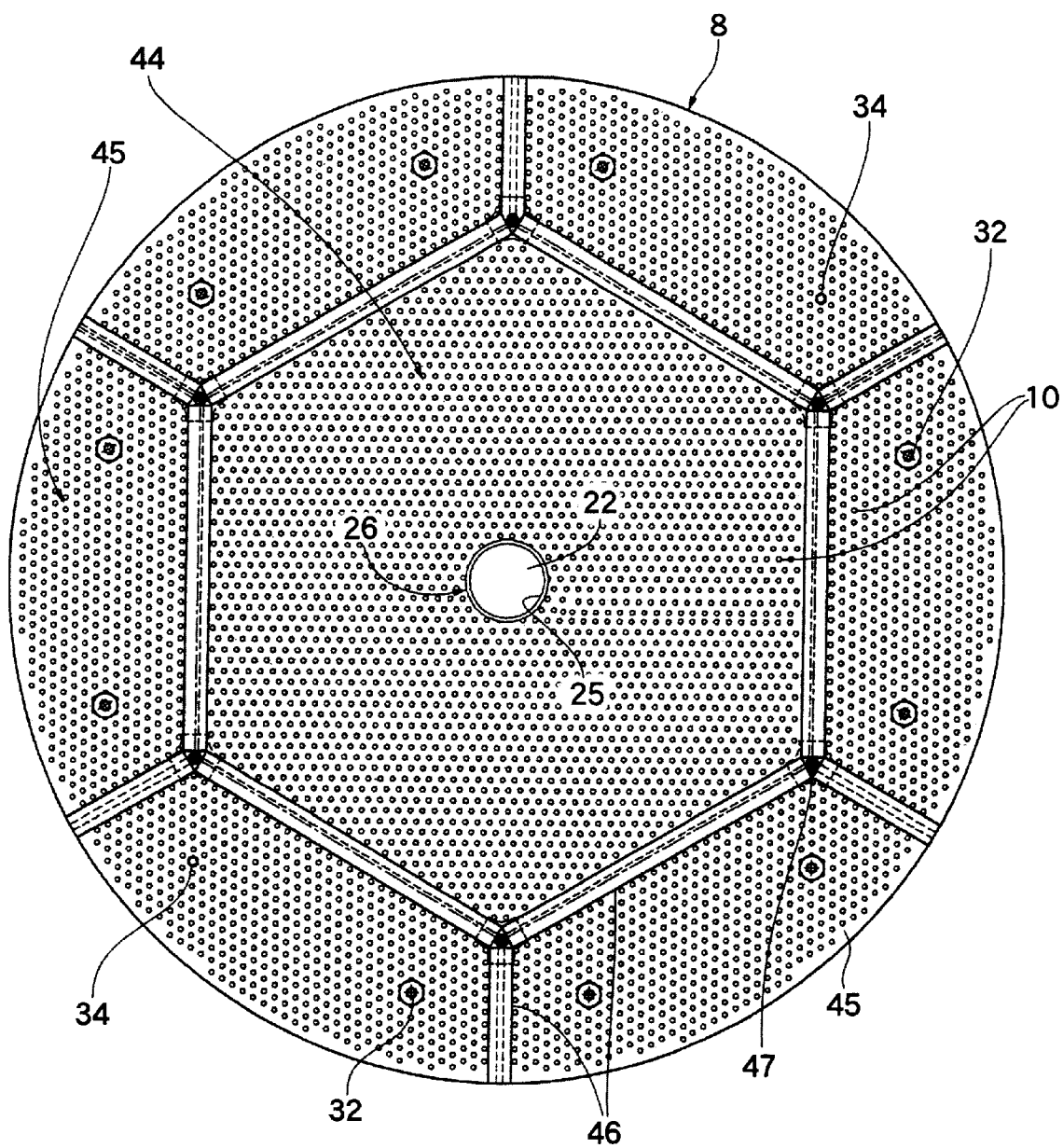
FIG. 3 is an enlarged plan view of the carrier disc for rooting anaerobic microorganisms therein.

The carrier disc 8, as shown in FIG. 3, is formed, by connecting outer units 45 circularly around an outer circumference of a regular hexagonal object 44 with H-shaped rails 46 and corner spacers 47. Each of the outer units is the shape enclosed with lines which are a line of the regular hexagonal object 44, radiative lines from the center to each end of the line of the regular hexagonal object 44 and a circular arc of the casing 1 cut off by the radiative lines.

In this case, when an area of the carrier disc 8 is large, as it can be formed, by connecting the regular hexagonal object 44 and the outer unit 45 by means of H-shaped rails 46 and the corner spacers 47, it becomes a matter easily to deal with. The corner spacers 47 serve the purpose of connecting the H-shaped rails 46 with each other and also of regulating spaces 9 between each two carrier discs 8.

The regular hexagonal object 44 is formed, by connecting plural regular hexagonal units 48 in a honeycomb fashion with each other and also in the empty portions 49 in the outer circumference rhombic segments 50 with the neighboring regular hexagonal units 48 by means of the H-shaped rails 45, corner spacers 47 and intermediate spacers 51.

In this case, it becomes easy to provide for a casing of large sectional area by widening the areas of the regular hexagonal object 44 and the rhombic segments 50. The intermediate spacers 51 which locate at the tops of the regular hexagonal unit 45 end the rhombic segment 50, connect the H-shaped rails 45 with each other and regulate the space 9 between each two carrier discs 8.

The corner spacer 47 comprises a space forming portions 52, a protrusion 53 beneath the corner spacer 47, a protrusion receiver 54 which protrudes coaxially from the upside of the protrusion 53 and a pair of rail receivers 55 which protrude at an angle of 120 degrees at right angle with the axial line of the protrusion 53. From the protrusion 53 a hole 56 for the bolt 32 passes through the protrusion receiver 54. The H-shaped rails 45 are connected and supported by the pair of rail receivers 55 with each other.

In this case, the mutual corner spacers 47 are securely connected by means of the protrusion 53 and the protrusion receiver 54. Also they fit both objects for connecting the mutual H-shaped rails and for forming a space 9 between the carrier discs 8.

The central spacer 26 comprises, with respect to a large diameter portion 27' at one end of the axial hole 27, an inner step 57 for regulating fitting extent of another central spacer 26 and an outer step 58 for regulating fitting extent of the carrier disc 8. The dimension L1 from the outer step 58 to the end face 59 of the large diameter portion 27' regulates the space 9. The dimension L2 between the end face 59 of the central spacer 26 and the outer step 58 of another central spacer 26 is to suit with the thickness of the carrier disc 8 when another central spacer 26 is contacted onto the inner step 57.

In this case, merely making each central spacer 26 fit in each axial hole 25 of each carrier disc 8 and making the central spacers 26 fit with each other, the carrier discs 8 are connected securely with the settled space 9.

In FIGS. 11 and 12, the outer spacer 31 comprises by stages from one end to the other on its axial line a base 60, an axial portion 61 and a fit-in portion 62. The axial length L3 of the base 60 regulates the space 9. The axial length L4 of the axial portion 61 fits with the thickness of the carrier disc 8. The axial length L5 of the fit-in portion 62 fits with the axial length L6 of an enlarged portion 63. The enlarged portion 63 is formed at an end portion on the base 60 side of the axial hole 35 and the fit-in portion 62 of an outer space 31 of a similar construction to the outer spacer 31 is fitted therein.

In this case, as the mutual outer spacers 31 are regulated of their fit-in depth by means of the fit-in portion 62 and the enlarged portion 63, the carrier disc 8 is prevented from deforming by over-fastening with a bolt 32 and a nut 36.

Figure 16:
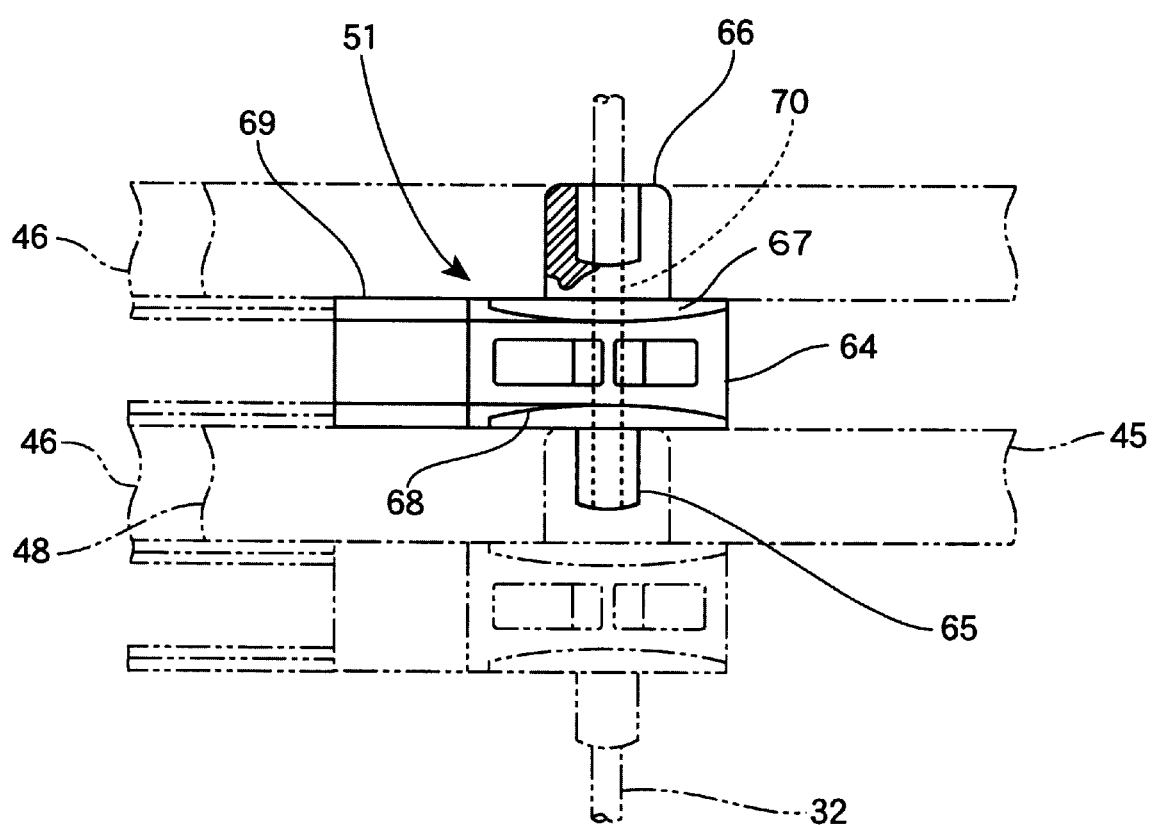
FIG. 16 is a partially cut off side view of the central spacer.
Figure 17:
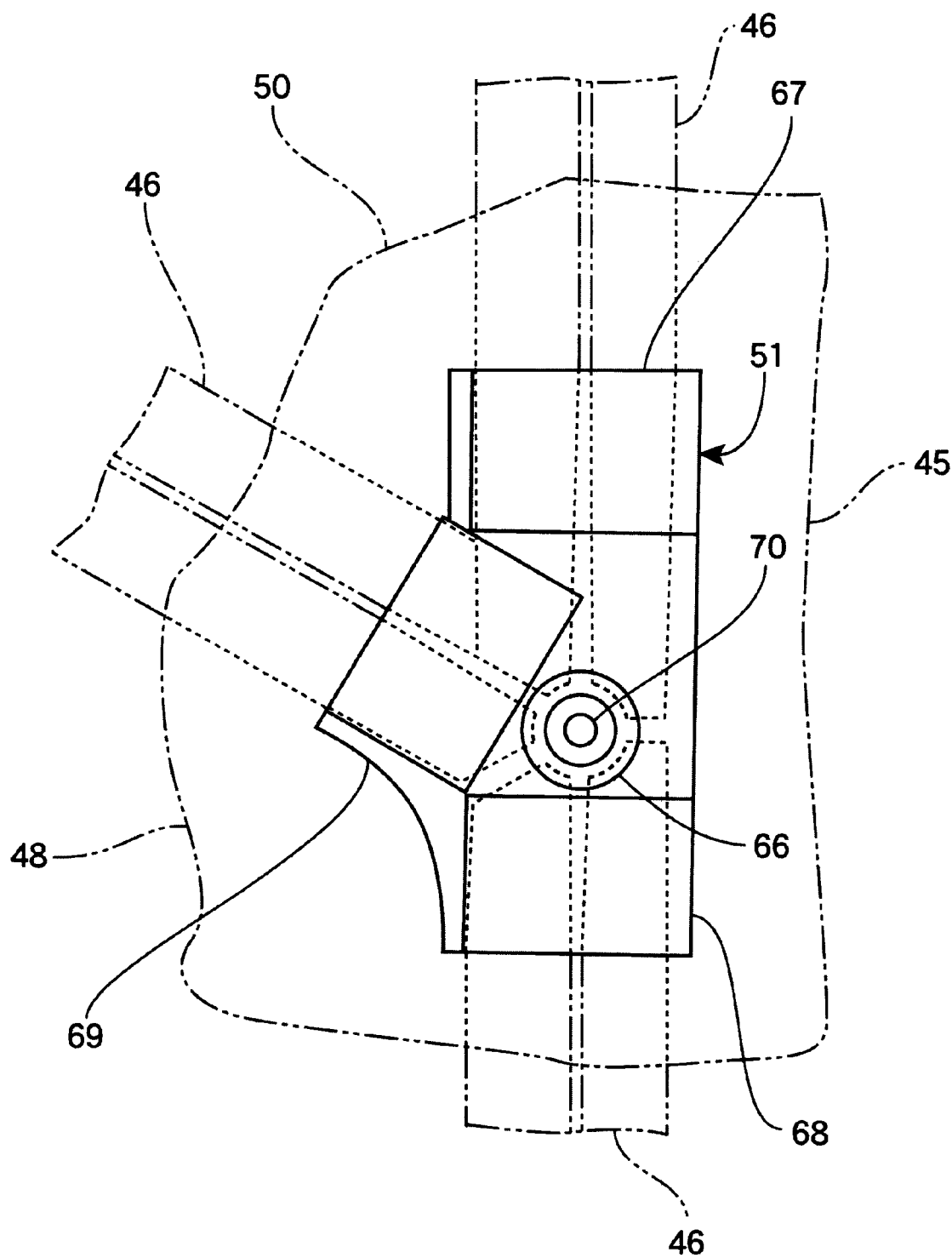
FIG. 17 is a plan view of the same.

In FIGS. 16 and 17, the central spacer 51 may be composed as follows, that is, the central spacer 51 comprises the space forming portion 64, the protrusion 65 beneath the space forming portion 64, the protrusion receiver 66 which protrudes coaxially the upside of the protrusion 65, a pair of rail receivers 67 and 68 which protrude at an angle of 180 degrees at right angle with the axial line of the protrusion 65 an a rail receiver 69 which protrudes between the rail receivers 67 and 68 at 60 degrees with one or the other side thereof. A hole 70 for the bolt 32 passes from the protrusion 65 through the protrusion receiver 66, and the H-shaped rails 46 are connected with each other, supported between the neighboring pair of rail receivers 67, 68 and 69.

In this case, the H-shaped rails 46 can be added in the middle with each other, therefore, the H-shaped rail of long size is not necessary and forming is easily done.

Figure 4:
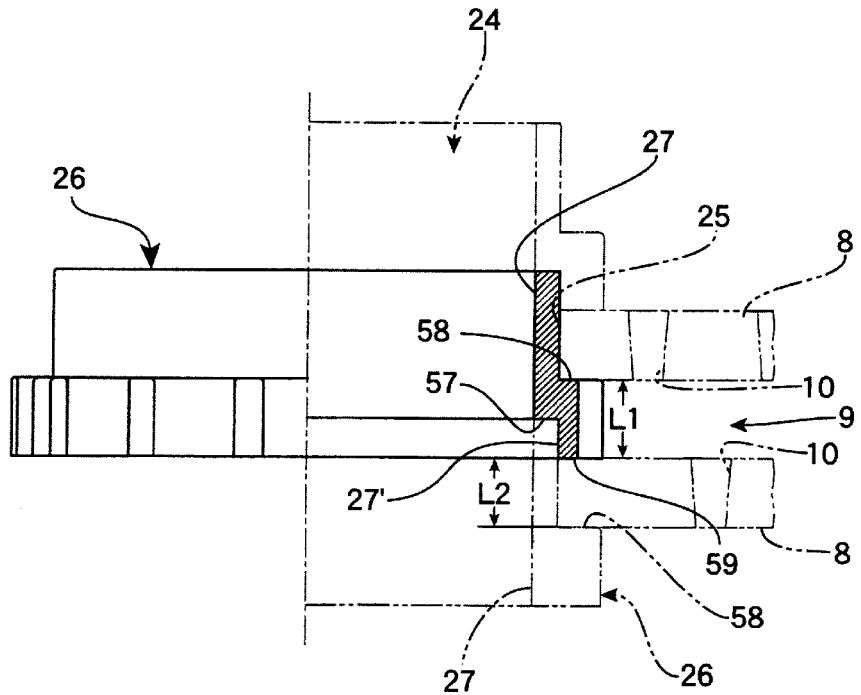
FIG. 4 is a half-sectioned side view of the central spacer.
Figure 5:
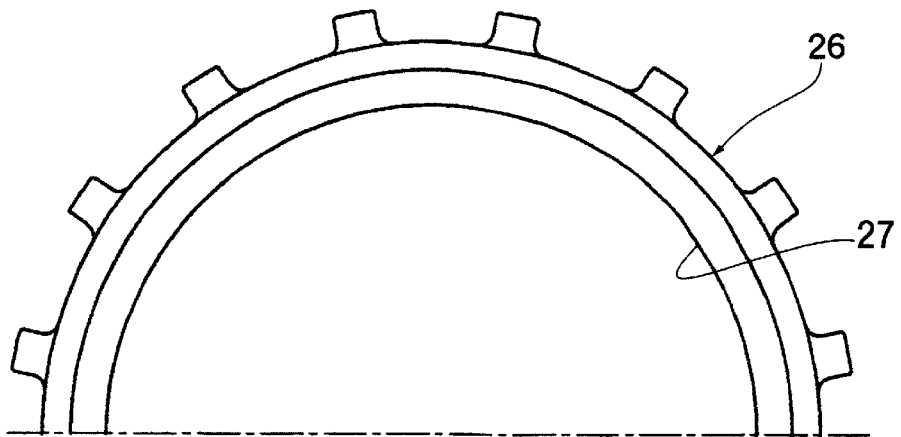

As seen in FIG. 4, the liquid passage 10 is the shape of a cone cut off at its head, a bore of said liquid passage (10) in the raw water inflow side being smaller than that of outflow side.

In this case, when the raw water or the treated water passes through the liquid passages 10, its current speed at the outflow side rises and it comes into collision with and diffuses on the under carrier disc. Thus, it gets many opportunities for contacting with microorganisms and its purifying efficiency is raised.

EFFECT OF THE INVENTION

According to the present invention, it can maintain a habitat of anaerobic microorganisms as the casing is a tightly closed type. The casing is a vertical type, at the upper portion thereof the inflow port for raw water being open, at the lower portion thereof the outflow port for the treated water being open, the carrier assembly preventing the direct pass of the inflow port to the outflow port, so that raw water does not drain without treatment. As anaerobic microorganisms live in the pores of the carrier discs which are made of porous polyethylene for comprehensively rooting anaerobic microorganisms, they are not carried away by flowing water and it can treat effectively. The mutual flowing passages of carrier discs locate such positions as not overlapped with each other on a projected plane, the raw water is promoted to be a turbulent flow to make contacting chance with microorganisms large and the treating efficiency high.

According to claim 2, the raw water does not flow out without treatment. Also, the circulating water which is fed in the casing does not flow out as it is through the port. Accordingly, the water to be treated is taken out continuously through the outflow port after it has been purified by repeated turns of certain numbers.

According to claim 3, the purified water which exists in the upper portion of the casing is taken out through the orifices of the circular wall from the outflow port and it can prevent the flowing out of insufficiently treated water.

According to claim 4, beneath the casing the circuit is not exposed and it does not become an obstruction.

According to claim 5, by connecting plural central spacers with each other, fitting them in each axial hole of each carrier disc, the axial holes of these central spacers form in series an outflow passage and it is not necessary to use a separate pipe.

According to claim 6, raw water can be treated by shifting on occasions according to the cases where raw water may be treated at one time and it may if necessary be treated repeatedly.

According to claim 7, when the carrier discs and the outer spacers increase in number, they are made in one body by fastening with bolts and nuts on the support frames and they are easily treated.

According to claim 8, the lowest central spacer is fitted in the central support ring and supported by the underside thereof with the boss and the arms, so that the central spacer does not move horizontally or fall off and the outflow passage is surely formed.

According to claim 9, as the outer spacer fits in the outer support ring and is supported of its bottom on the frames, the outer spacer does not move horizontally or fall off, and the carrier assembly is not deformed.

According to claims 10, when an area of the carrier disc is large, it can be formed, by connecting the regular hexagonal object with the outer unit by means of H-shaped rails and the corner spacers, it becomes a matter easily to deal with. The corner spacers serve the purpose of connecting the H-shaped rails with each other and also of regulating spaces between each two carrier discs.

According to claim 11, it becomes easy to provide for a casing of large sectional area by widening the areas of the regular hexagonal object and the rhombic segments. The intermediate spacers which locate at the tops of the regular hexagonal unit and the rhombic segment, connect the H-shaped rails with each other and regulate the space between each two carrier discs.

According to claim 12, the mutual corner spacers are securely connected by means of the protrusion and the protrusion receiver. Also they fit with both objects for connecting the mutual H-shaped rails and for forming a space between the carrier discs.

According to claim 13, merely making each central spacer fit in each axial hole of each carrier disc and making the central spacers fit with each other, the carrier discs are connected securely with the settled space.

According to claim 14, as the mutual outer spacers are regulated of their fit-in depth by means of the fit-in portion and the enlarged portion, the carrier disc is prevented from deforming by over-fastening with a bolt and a nut.

According to claim 15, the H-shaped rails can be added in the middle with each other, therefore, the H-shaped rail of long size is not necessary and forming is easily done.

According to claim 16, when the raw water or the treated water passes through the liquid passages, its current speed at the outflow side rises and it comes into collision with and diffuses on the under carrier disc. Thus, it gets many opportunities for contacting with microorganisms and its purifying efficiency is suitably raised.

What is claimed is:

1. An apparatus for treating organic raw water utilizing anaerobic microorganisms comprising a casing (1) and a carrier assembly (2), said casing (1) being of a vertical type having a main body (3), a bottom wall (4) and a ceiling (5) and having an inflow port (6) for raw water at the upper portion thereof and an outflow port (7) for the treated water at the lower portion thereof, and said carrier assembly (2) comprising a plurality of stacked carrier discs (8) formed of porous plastic material, such as polyethylene for rooting anaerobic microorganisms therein with a space (9) between every two carrier discs (8), and no overlapping of liquid passages (10) which are provided evenly or uniformly all over each disc (8) through the assembly of said stacked carrier discs with each other, and said carrier assembly (2) being disposed in said casing (1) so as to prevent the direct leading of said inflow port (6) to said outflow port (7).

2. An apparatus for treating organic raw water utilizing anaerobic microorganisms as claimed in claim 1, wherein said casing (1) has a taking out port (18) for the treated water above said inflow port (6), and said outflow port (7) connects with a circuit (19) and said circuit (19) connects by means of a pump (20) with a circulating water supply port (21) which is open within said casing (1) between said inflow port (6) and said taking out port (18).

3. An apparatus for treating organic raw water utilizing anaerobic microorganisms as claimed in claim 2, wherein said taking out port (18) passes in said casing (1) through orifice (23) which are perforated radially above said taking out port (18) through a circular wall (22) axially installed in said casing (1).

4. An apparatus for treating organic raw water utilizing anaerobic microorganisms as claimed in claim 2, wherein a part of said circuit (19) is an outflow passage (24) along an axial line of said carrier assembly (2), with an opening at the lower end of said outflow passage (24) forming said outflow port (7).

5. An apparatus for treating organic raw water utilizing anaerobic microorganisms as claimed in claim 4, wherein said outflow passage (24) is formed by the continuation of an axial hole (27) of a central spacer (26) which forms a space (9) between two carrier discs (8), in a hole (25) provided axially on said carrier disc (8).

6. An apparatus for treating organic raw water utilizing anaerobic microorganisms as claimed in claim 5, wherein said central spacer (26) comprises, with respect to a large diameter portion (27') at one end of said axial hole (27), an inner step (57) for regulating a fitting extent of another central spacer (26) and an outer step (58) for regulating a fitting extent of said carrier disc (8), the dimension (L1) from said outer step (58) to the end face (59) of said large diameter portion (27') regulating said space (9), the dimension (L2) between said end face (59) of said central spacer (26) and said outer step (58) of another central spacer (26) being sized to suit with the thickness of said carrier disc (8) when another central spacer (26) is in contact with said inner step (57).

7. An apparatus for treating organic raw water utilizing anaerobic microorganisms as claimed in claim 2, wherein said outflow port (7) passes alternatively by way of a changeover valve (28) to a drain (29) or to said circuit (19).

8. An apparatus for treating organic raw water utilizing anaerobic microorganisms as claimed in claim 1, wherein said carrier assembly (2) comprises support frames (30), said carrier discs (8) and outer spacers (31), and said support frames (30) and said carrier discs (8) being provided with holes (33, 34) for bolts (32) on the same vertical line, with said carrier assembly (2) being assembled, by piling carrier discs (8) on said support frames (30) by means of said outer spacers (31), and by passing said bolts (32) through said holes (33, 34) and axial holes (35) of said outer spacers (31), and by fastening nuts (36) onto said bolts (32), and with said carrier assembly being settled by fixing said support frames (30) to arms (37) of said casing (1).

9. An apparatus for treating organic raw water utilizing anaerobic microorganisms as claimed in claim 8, wherein said support frame (30) comprises a boss (38), arms (39), frames (40) and a central support ring (41); said boss (38) having a hole (42) fitting with said axial hole (27) of said central spacer (26); said arms (39) protruding radially from said boss (38), said frames (40) being spanned between the end portions of said arms (39) and perforated with said holes; and said central support ring (41) having an inner diameter larger than that of said hole (42), and fitting with an outer diameter of said central spacer (26) and being set to said arms (39) at one end of said boss (38) concentrically therewith.

10. An apparatus for treating organic raw water utilizing anaerobic microorganisms as claimed in claim 9, wherein said frames (40) have at one end of each said hole (33) an outer support ring (43) for receiving said outer spacer (31).

11. An apparatus for treating organic raw water utilizing anaerobic microorganisms as claimed in claim 8 or 10, wherein said outer spacer (31) comprises by stages from one end to the other on its axial line a base (60), an axial portion (61) and a fit-in portion (62), the axial length (L3) of said base (60) regulating said space (9), the axial length (L4) of said axial portion (61) fitting and/or corresponding with the thickness of said carrier disc (8), the axial length (L5) of said fit-in portion (62) fitting with the axial length (L6) of an enlarged portion (63) which is formed, to set said fit-in portion (62') of an outer spacer (31') of similar construction to said outer spacer (31), in an end portion on said base (60) side of said axial hole (35).

12. An apparatus for treating organic raw water utilizing anaerobic microorganisms as claimed in claim 1 or 8, wherein said carrier disc (8) is formed, by connecting outer units (45) circularly around an outer circumference of a regular hexagonal object (44) with H-shaped rails (46) and corner spacers (47), each of said outer units being of a shape enclosed with lines which are a line of said regular hexagonal object (44), radial lines from the center to each end of said line of said regular hexagonal body (44) and a circular arc of said casing (1) cut off by said radial lines.

13. An apparatus for treating organic raw water utilizing anaerobic microorganisms as claimed in claim 12, wherein said regular hexagonal body (44) is formed, by connecting plural regular hexagonal units (48) in a honeycomb fashion with each other and with empty portions (49) of outer circumference rhombic segments (50) with adjacently disposed regular hexagonal units (48) by means of said H-shaped rails (46), said corner spacers (47) and intermediate spacers (51).

14. An apparatus for treating organic raw water utilizing anaerobic microorganisms as claimed in claim 13, wherein said intermediate spacer (51) comprises a space forming portion (64), a protrusion (65) beneath said space forming portion (64), a protrusion receiver (66) which protrudes coaxially from above said protrusion (65) and said space forming portion, a pair of rail receivers (67, 68) protruding at an angle of 180 degrees at right angle with the axial line of said protrusion (65) and a rail receiver (69) which protrudes between said rail receivers (67, 68) at 60 degrees with one or the other side thereof; and wherein passageway (70) for said bolt (32) passing from said protrusion (65) through said protrusion receiver (66), and wherein said H-shaped rails (46) are connected to each other, and are supported by said pair of rail receivers.

15. An apparatus for treating organic raw water utilizing anaerobic microorganisms as claimed in claim 13, wherein said corner spacer (47) comprises space forming portions (52), a protrusion (53) beneath said corner spacer, a protrusion receiver (54) protruding coaxially above said protrusion (53) and a pair of rail receivers (55) which protrude at an angle of 120 degrees at right angle with the axis of said protrusion (53), from said protrusion (53); and wherein a hole (56) for said bolt (32) passing through said protrusion receiver (54), and wherein said H-shaped rails (45) are connected to each other and are supported by said pair of rail receivers (55).

16. An apparatus for treating organic raw water utilizing anaerobic microorganisms as claimed in claim 12, wherein said corner spacer (47) comprises space forming portions (52), a protrusion (53) beneath said corner spacer, a protrusion receiver (54) protruding coaxially above said protrusion (53) and a pair of rail receivers (55) which protrude at an angle of 120 degrees at right angle with axis of said protrusion (53), from said protrusion (53); and wherein hole (56) for said bolt (32) passing through said protrusion receiver (54), and wherein said H-shaped rails (46) are connected to each other, and are supported by said pair of rail receivers (55).

17. An apparatus for treating organic raw water utilizing anaerobic microorganisms as claimed in claim 1, wherein each said liquid passage (10) is in the shape of a cone with a bore of said liquid passage (10) in the raw water inflow side being smaller than that of the outflow side.

18. An apparatus for treating organic raw water utilizing anaerobic microorganisms as claimed in claim 1, where a plurality of said apparatus are connected in series.

19. An apparatus for treating organic raw water utilizing anaerobic microorganisms as claimed in claim 1, wherein a plurality of said apparatus are connected in parallel.

20. An apparatus for treating organic raw water utilizing anaerobic microorganisms as claimed in claim 1, wherein said apparatus is utilized in combination with a conventional aerobic treating apparatus.

* * * * *